(12) United States Patent
Munekata

(10) Patent No.: US 6,464,502 B1
(45) Date of Patent: Oct. 15, 2002

(54) THREE-DIMENSIONAL INTRA-GLOBE MODEL

(76) Inventor: Kuniko Munekata, 4-21-16 Saginomiya Nakano-ku, Tokyo (JP)

( * ) Notice: Subject to any disclaimer, the term of this patent is extended or adjusted under 35 U.S.C. 154(b) by 0 days.

(21) Appl. No.: 09/688,973

(22) Filed: Oct. 17, 2000

(30) Foreign Application Priority Data

May 16, 2000 (JP) ........................................ 2000-142872

(51) Int. Cl.[7] .............................................. G09B 25/06
(52) U.S. Cl. ........................ 434/131; 434/130; 434/135
(58) Field of Search ............................. 434/130, 131, 434/132, 144, 148, 135, 141, 146, 147; D19/61; 362/363

(56) References Cited

U.S. PATENT DOCUMENTS

| | | | | |
|---|---|---|---|---|
| 2,402,194 A | * | 6/1946 | Wolfe | |
| 2,510,213 A | * | 6/1950 | Ekstedt et al. | |
| 5,033,965 A | * | 7/1991 | Chui et al. | 434/131 |
| 5,676,550 A | * | 10/1997 | Giamportone et al. | 434/130 |
| 6,068,486 A | * | 5/2000 | Frank et al. | 434/135 |

* cited by examiner

Primary Examiner—Jacob K. Ackun
Assistant Examiner—Bena B. Miller
(74) Attorney, Agent, or Firm—Finnegan, Henderson, Farabow, Garrett & Dunner LLP

(57) ABSTRACT

A globe that shows internal structures of the earth three-dimensionally. The globe comprises a plurality of concentrically arranged spheres 1, 2, 3, 4 which are made of a transparent material except the innermost sphere and three-dimensional displaying members 5 to 11 which are arranged in the spaces between the spheres and represent the physically continuous internal structure of the earth.

4 Claims, 7 Drawing Sheets

FIG. 3(A)
FIG. 3(B)
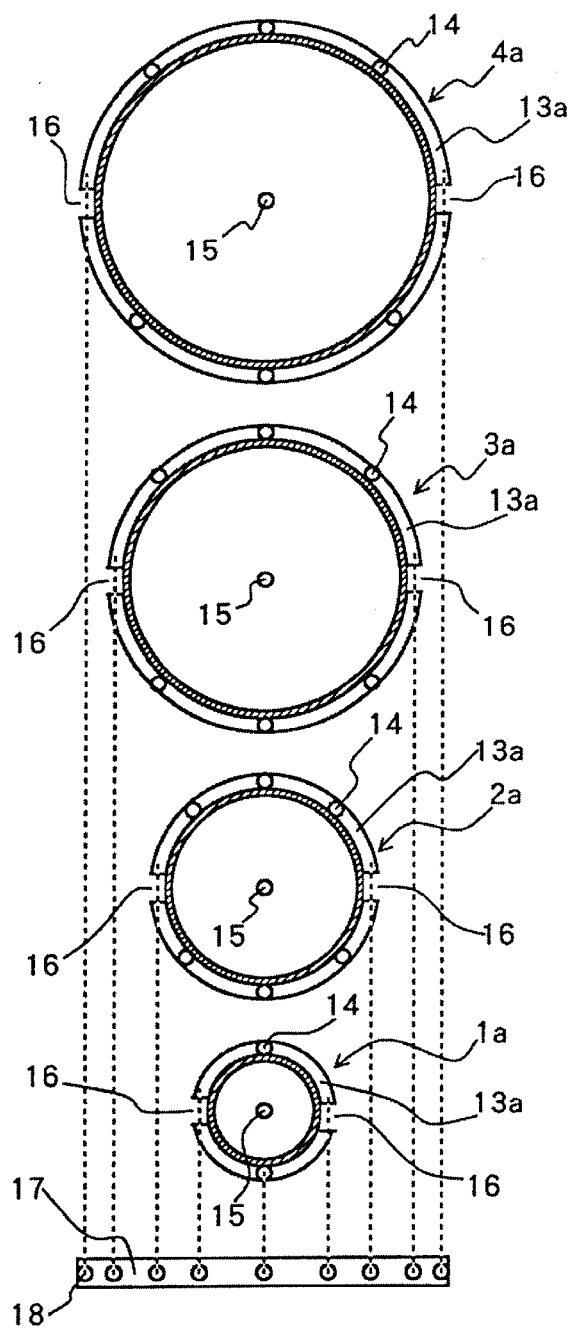
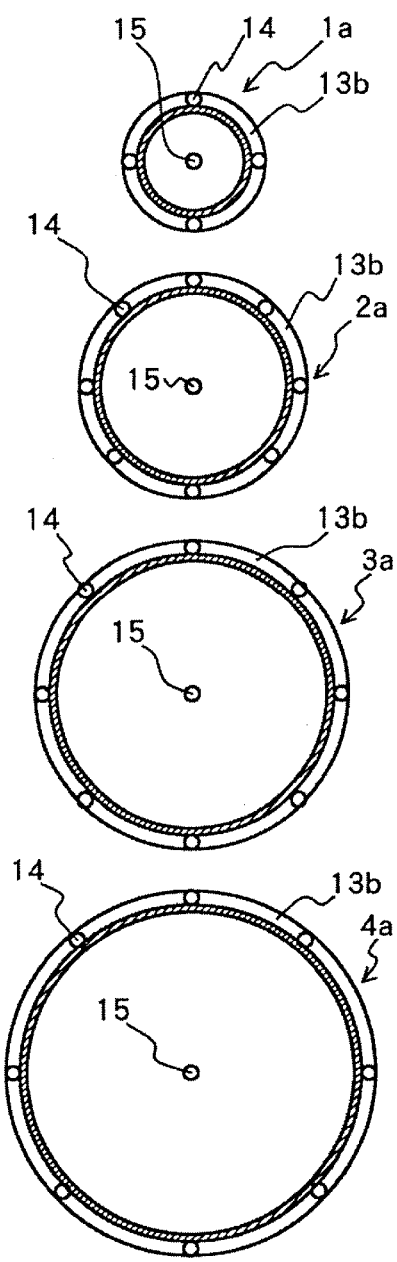

THREE-DIMENSIONAL INTRA-GLOBE MODEL

BACKGROUND OF THE INVENTION

1. Field of the Invention

The present invention relates to a three-dimensional intra-globe model which displays the internal layered structure of the earth representing the dynamic movements mechanism thereof.

2. Description of Prior Art

The earth comprises three internal portions. They are a central core, a lower mantle and an upper mantle. The central core comprises an inner solid core and an outer liquid core of metal iron. The lower mantle and the upper mantle are composed of solid rocks and surround the central core portion. The upper mantle layer includes a 6 to 40 km-thick crust.

The surface layer of the earth comprises 12 plates that are moving and influencing each other. The plates move and change on the basis of the plate tectonics dominated by horizontal movements.

The lower mantle moves and changes on the basis of plume tectonics comprising cold downwelling plumes and hot upwelling plumes dominated by vertical movements.

The central core activates and changes on the basis of the growth tectonics in accordance with the gradual cooling of the earth.

The inside of the earth is mobilized by the dynamics of these three portions of the earth that are mutually correlated to give rise to the entire earth dynamics.

Conventional globe models typically comprise a main globe body that is an opaque sphere and displays on the surface thereof various data of the surface layer of the earth including those of continents and other land masses, the oceans and the national boundaries as well as major cities, mountains, rift valleys, troughs and submarine volcanoes. The spherical main globe body displaying data of the surface layer of the earth is then rotatably held by a semicircular support frame with the axis of rotation normally running through the poles. The support frame is rigidly secured to a base.

Such globes, however, show only the surface layer of the earth and hence cannot show the internal structure of the earth containing the core and the mantle therein.

Meanwhile, U.S. Pat. No. 5,676,550 discloses an earth planet model that displays the inside of the earth. The globe model of the U.S. patent comprises three transparent spheres that correspond respectively to the inner core, the outer core and the mantle. Each sphere displays on the surface thereof the structure of the respective inner portion.

However, since the earth planet model of the U.S. patent is designed mainly to display the plate tectonics structure of the surface layer or the crust of the earth, the prior art model only shows rough locations and sizes of the upper mantle, the lower mantle and the core by disposing the respective spheres within the outermost sphere, in terms of the internal structure of the earth. In the prior art globe model comprising concentric spheres, the. spaces between the spheres are not utilized for displaying the inner structure, but filled with a reinforcing foam material, for example, instead. Therefore, the prior art model does not sufficiently display the inside of the earth three-dimensionally including the areas corresponding to the spaces between the spheres.

SUMMARY OF THE INVENTION

In view of the foregoing of the prior art, it is therefore an object of the present invention to provide an intra-globe model which displays the entire internal structure of the earth three-dimensionally to make the viewer easily comprehend the configuration of the inner portions of the earth as well as the dynamics of the movements of each portion.

According to the invention, the above object is achieved by providing a three-dimensional intra-globe model characterized by comprising a plurality of concentrically arranged spheres made of transparent material except the innermost sphere and being provided with three-dimensional display members arranged between adjacent spheres in correspondence to intra-global structures.

With this arrangement, a plurality of spheres are concentrically assembled to form the model, the spheres being made of a transparent material except the innermost sphere, and the model is provided with three-dimensional display members arranged in the spaces between the spheres to indicates the corresponding respective parts of the inside of the earth so that viewers can easily comprehend the continuous structure of the inside of the earth through the transparent spheres. The outermost transparent sphere may be made to show the surface layer of the earth including the continents and the oceans. The innermost sphere may be transparent, translucent or opaque.

In a preferred arrangement of the three-dimensional intra-globe model as defined above, said spheres include first through fourth spheres corresponding respectively to the inner core, the outer core, the lower mantle and the upper mantle.

Between the first and the second spheres are provided with high-temperature and low-temperature display members corresponding respectively to the upwelling convection currents and the downwelling convection currents inside the liquid outer core.

Between the second and the third spheres are provided with high-temperature and low-temperature display members corresponding respectively to the hot plumes and the cold plumes inside the lower mantle.

Between the third and fourth spheres are provided with high-temperature and low-temperature display members corresponding respectively to the hot plumes and the cold slabs inside the upper mantle.

The twelve plates of the earth's surface layer are represented on the fourth sphere as well as the other geoscientific data of the surface layer of the earth. Moreover, dynamic movements in each layered domain inside the earth can be shown on each sphere surface.

As mentioned above, in accordance with this arrangement, four spheres are provided corresponding to the inner core, the outer core, the lower mantle and the upper mantle of the inside of the earth. The structure of the growth tectonics is three-dimensionally displayed in the space between the inner first and second spheres. The structure of the plume tectonics is three-dimensionally displayed in the space between the second and third spheres corresponding to the lower mantle. The structure of the plate tectonics is three-dimensionally displayed in the space between the third and fourth spheres corresponding to the upper mantle. The data on the surface layer of the earth is displayed on the surface of the fourth sphere. Thus, viewers can easily and sufficiently comprehend the internal structure of the earth as well as its surface layer.

In another preferred arrangement, a three-dimensional intra-globe model of the type as defined above is characterized in that each of said spheres comprises a pair of semispheres that can be put together and separated from each other and that the outermost sphere has a flange projecting outward from a parting interface rim thereof.

With this arrangement, each of the spheres comprises a pair of semispheres that can be put together and separated from each other with ease so that other necessary members can be arranged easily in the space between any adjacent spheres. Additionally, since the outermost sphere displaying the surface layer of the earth has a flange arranged around it, the globe can be easily handled and carried by holding the flange. Any of the other inner spheres may also be provided with a flange. The provision of such a flange can also facilitate assembling the semispheres.

In still another preferred arrangement, a three-dimensional intra-globe model as defined above is characterized in that the spheres are made unrotatable relative to each other by means of a link plate running through the center of the spheres.

With this arrangement, an oblong link plate is made to pass through the center of the parting interface rim of the semispheres and the spheres are rigidly secured to the link plate so that all the spheres may be linked to each other and made unrotatable relative to each other. Accordingly, all the spheres are made to keep a predetermined positional relationship. Also, they may be easily reassembled relative to each other if they are disassembled for some reason or other.

In still another preferred arrangement, a three-dimensional intra-globe model as defined above is characterized in that a spherical model comprising said plurality of concentric spheres are placed on a cylindrical base without being rigidly fitted thereto.

With this arrangement, the spherical globe is simply placed and supported on the base without being rigidly fitted to the base so that the user can easily lift and move the globe to change its attitude on the base for the convenience of viewing any desired part of the inside of the globe.

BRIEF DESCRIPTION OF THE DRAWINGS

FIG. 3 shows exploded schematic plan views of semi-spheres of the globe according to the invention.

DETAILED DESCRIPTION OF THE INVENTION

The present invention will be described further by referring to the accompanying drawings that illustrate a preferred embodiment of the invention.

Figure 1:
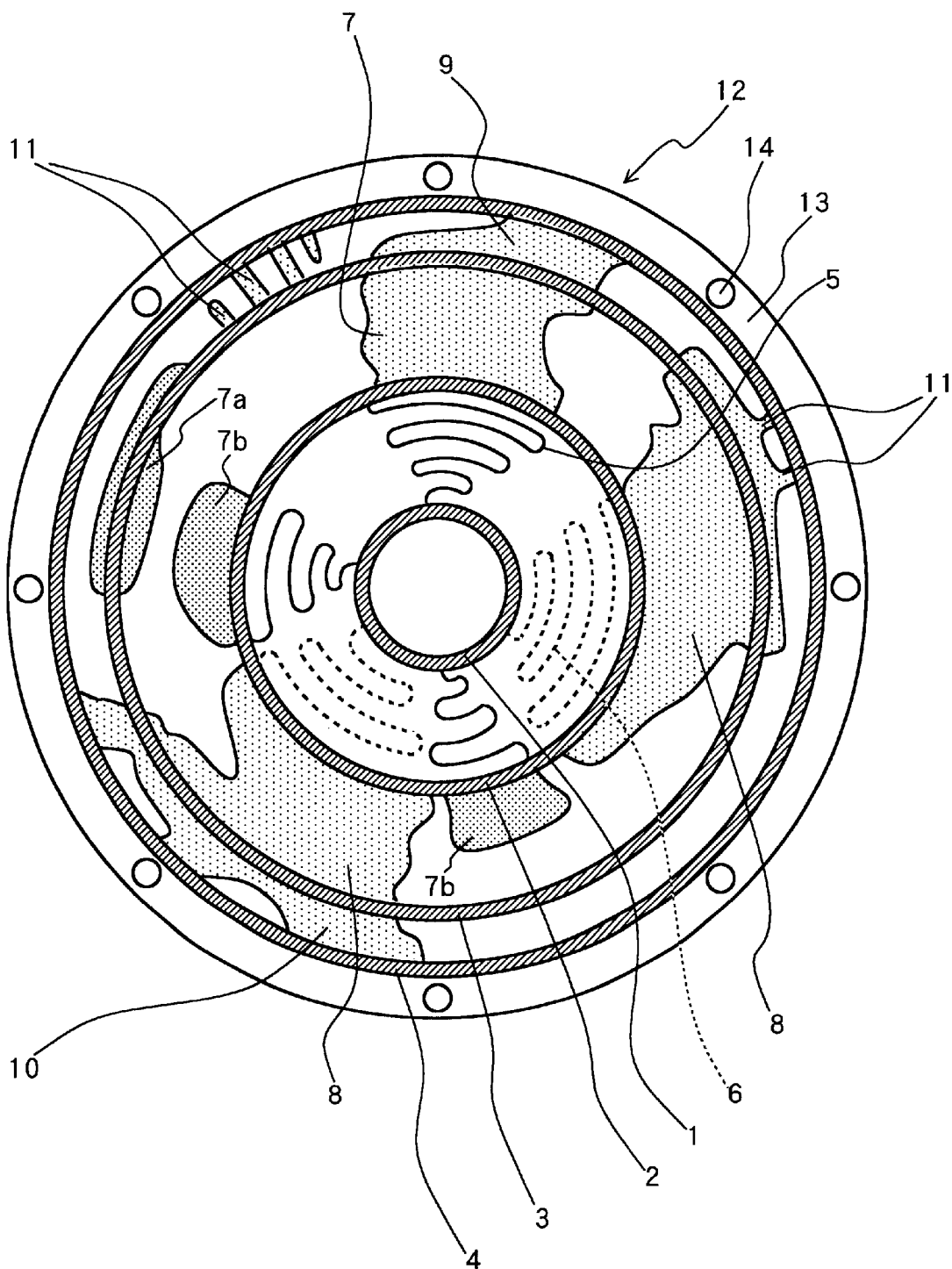
FIG. 1 shows a schematic illustration of a three-dimensional intra-globe model according to the invention, showing its basic configuration.

FIG. 1 is a schematic cross sectional view of an embodiment of intra-global three-dimensional model according to the-invention, showing its basic configuration.

A main globe body 12 comprises four concentrically arranged spheres including the first through fourth spheres 1 through 4. The first through fourth spheres 1 through 4 are made of a light-weight plastic material or a polymeric composite material that is transparent and sufficiently hard and durable. The innermost first sphere 1 corresponds to the inner core of the earth and its surface is red-colored or coated with red film, The first sphere 1 does not need to be transparent. It may be made of a red and translucent or opaque plastic material.

The-second sphere 2 corresponds to the outer core of the earth. Cold convection current-displaying members 5 and hot convection current displaying members 6 corresponding respectively to the cold downwelling vortical convection currents and the hot upwelling vortical convection currents in the central core of the earth are arranged between the first sphere 1 and the second sphere 2. Each of the displaying members 5, 6 is composed of a helical wire covered by a blue tube (indicating coldness) or a red tube (indicating hotness) and bonded to the outer surface of the first sphere or the inner surface of the second sphere by means of a piece of transparent sticky tape or adhesive agent. As a result of using such a helical wire, each of the displaying members 5, 6 can be securely held between the two spheres 1, 2 because of its resiliency. The cold convection current displaying members 5 and the hot convection current displaying members 6 are arranged at respective proper positions between the two spheres 1, 2 as determined by referring to the latest knowledge on the internal structure of the earth.

The third sphere 3 corresponds to the lower mantle of the earth. Cold plume displaying members 7 and the hot plume displaying members 8 corresponding respectively to the cold plumes (falling currents) and the hot plumes (rising currents) are arranged between the second sphere 2 and the third sphere 3. Each of the displaying members 7, 8 is typically made of spongy foamed urethane and colored in blue (to indicate coldness) or red (to indicate hotness) and profiled according to the data obtained most recently for the plume tectonic portions of the earth. Data on the internal structure of the earth including those on the plume tectonic portions are available from the data for cross sectional images of the entire earth corresponding to the internal structure of the mantle, obtained by using seismic P waves and analyzing the distribution of the seismic speed and directions of propagation of the wave (as published in 1998).

The plume displaying members 7, 8 may typically be formed in a manner as described below. First, images of top views of the cold plumes and super plumes are drawn on the surface sphere 4 on the basis of the above data. The drawn images of the plumes are projected on the sphere of the outer core (second sphere 2) to copy them thereon with a reduced scale. Then, images of the cross sectional views of the plumes at an interval of 200 to 300 km are drawn on the sphere 4 of the surface layer on the basis of the above data for cross section images of the earth particularly in terms of the directions and positions of the meandering plumes. The drawn cross sectional images of the plumes are projected on the sphere 2 of the outer core to copy them with the reduced scale. This process of drawing cross sectional images of the plumes is repeated so that the profiles and the positions of the displaying members 7, 8 are defined on the sphere of the outer core. After that, the displaying members 7, 8 of the plumes are accurately formed with the use of urethane foam,e.g.

Note that the cold plumes include stagnant cold masses which are represented by displaying members 7a and 7b. Each mass 7a is suspended from the top surface of the lower mantle (third sphere 3) into the middle portion thereof without reaching the outer core. The cold mass 7b is projecting from the outer core surface into the lower mantle without reaching the surface of the lower mantle. The displaying members of the plume (cold mass)7a are formed by drawing images thereof from the lower mantle surface side. Whereas the displaying members of the cold mass 7b are formed by drawing images thereof from its bottom side.

The cold mass displaying members 7, 7b on the sphere of the outer core are arranged at positions connected to the respective cold convection current displaying members 5 in the inside of the outer core, while the hot plume displaying members 8 are arranged at positions connected to the respective hot convection current displaying members 6 in the inside of the outer core.

The fourth sphere 4 corresponds to the upper mantle of the earth and its surface corresponds to the surface layer (i.e., plate) of the earth. Between the spheres 3 and 4 are arranged cold slab displaying members 9 (stagnant materials) and hot plume displaying members 10,respectively. The members 9 correspond to the cold stagnant materials connected to the cold plumes of the lower mantle, whereas the members 10 correspond to the hot plumes connected to the hot upwelling plumes of the lower mantle. These displaying members 9,10 are formed typically from foamed urethane by using the available data on the internal structure of the earth.

Furthermore, between the spheres 3 and 4 are disposed hot spot displaying members 11 for displaying hot spots in the upper mantle, which correspond to on-land volcanoes or submarine volcanoes. The hot spot displaying members 11 are made of foamed urethane as described above or some other appropriate resin material. A plastic film material or an artificial straw material may advantageously be used for them because such a material is available at low cost. The displaying members 9, 10 and 11 are formed on the basis of the data obtained most recently for the internal structure of the earth.

Each of the above displaying members 7 through 11 arranged between the second sphere and the fourth sphere may alternatively be made of paper or a plastic material instead of foamed urethane and is then firmly bonded to the outer surface or the inner surface, whichever appropriate, of the related sphere by means of adhesive agent or a piece of transparent sticky tape.

On the outermost sphere 4 are depicted major latitudes and longitudes, the boundaries of landmasses and oceans and major fault fissures (transform faults) of mid-ocean ridges in colored lines, e.g. in black lines. Major latitudes and longitudes may also be drawn on the surfaces of the first through third spheres as well. Mid-ocean ridges, rift valleys on the continents and hot spots may be shown in red, while mid-ocean super swells produced by super plumes may be indicated by red dotted lines. The lines defining the subduction zones from which the plates subduct, or ocean troughs, may be shown in blue. The tectosphere including the crust of the Archean Era may be indicated by white dotted lines. Although these lines and markings make it possible to recognize twelve plates on the globe, the boundaries of these plates may be confirmatively drawn in black lines. The denominations of the twelve plates are also shown. The names of the countries, major cities and other data on the surface of the earth may be shown on the surface of the fourth sphere along with the above data on landmasses, rift valleys, troughs and mid-ocean swells.

The outermost fourth sphere 4 is provided with a flange 13 on the outer periphery thereof. The flange 13 serves as a connecting means for connecting semispheres when the sphere is produced by assembling the semispheres by means of bolts through a plurality of (eight in this embodiment) bolt receiving holes 14 bored therethrough as will be discussed hereinafter. The flange 13 also serves as handle to be used for holding the globe to lift and rotate on the base (which will be described hereinafter) and replacing it on the base for viewing any desired location. As will be described hereinafter, not only the fourth sphere but also the first through third spheres may be provided with such a flange 13.

Figure 2:
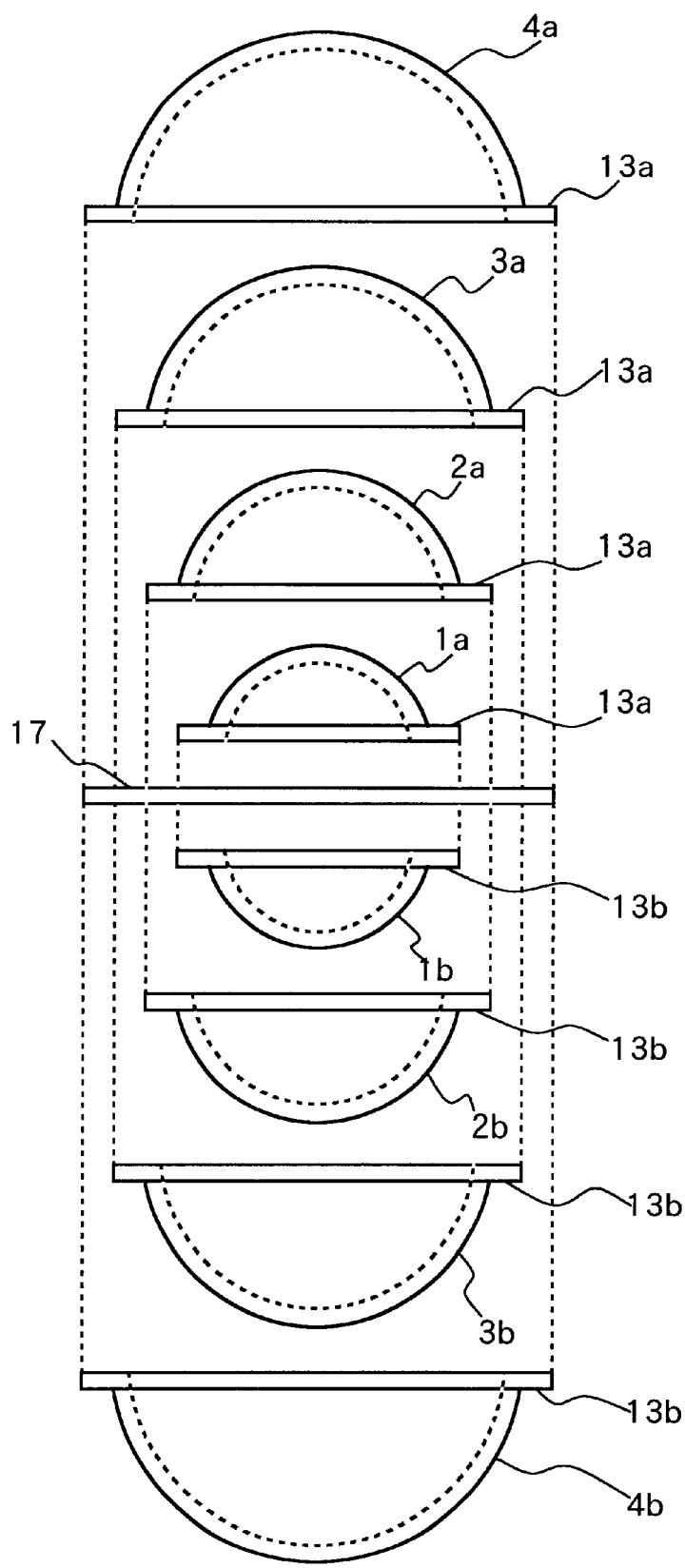
FIG. 2 shows exploded schematic side views of semi-spheres of the globe according to the invention.
Figure 4:
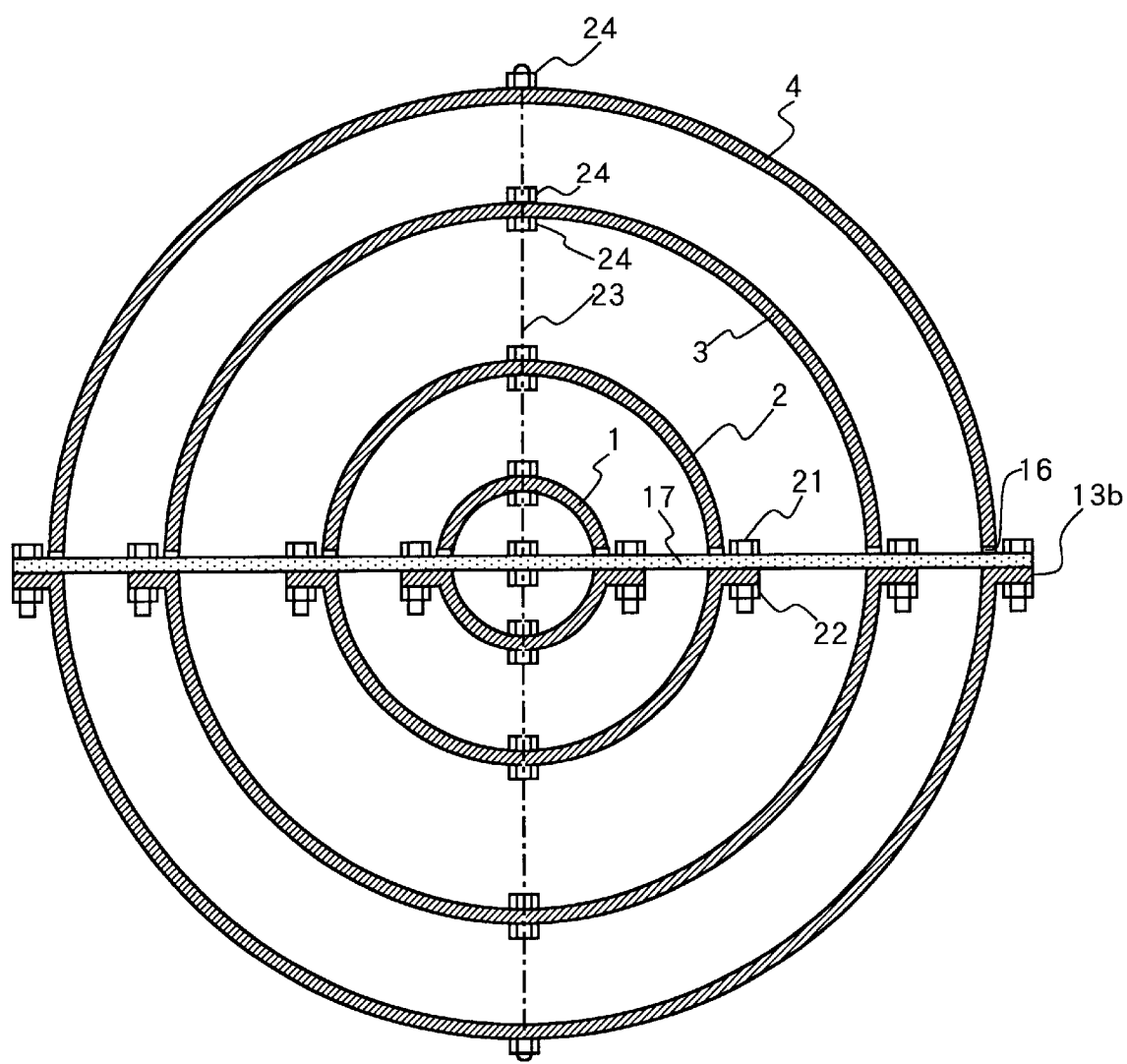
FIG. 4 shows a schematic vertical cross section view of the assembled globe according to the invention.
Figure 5:
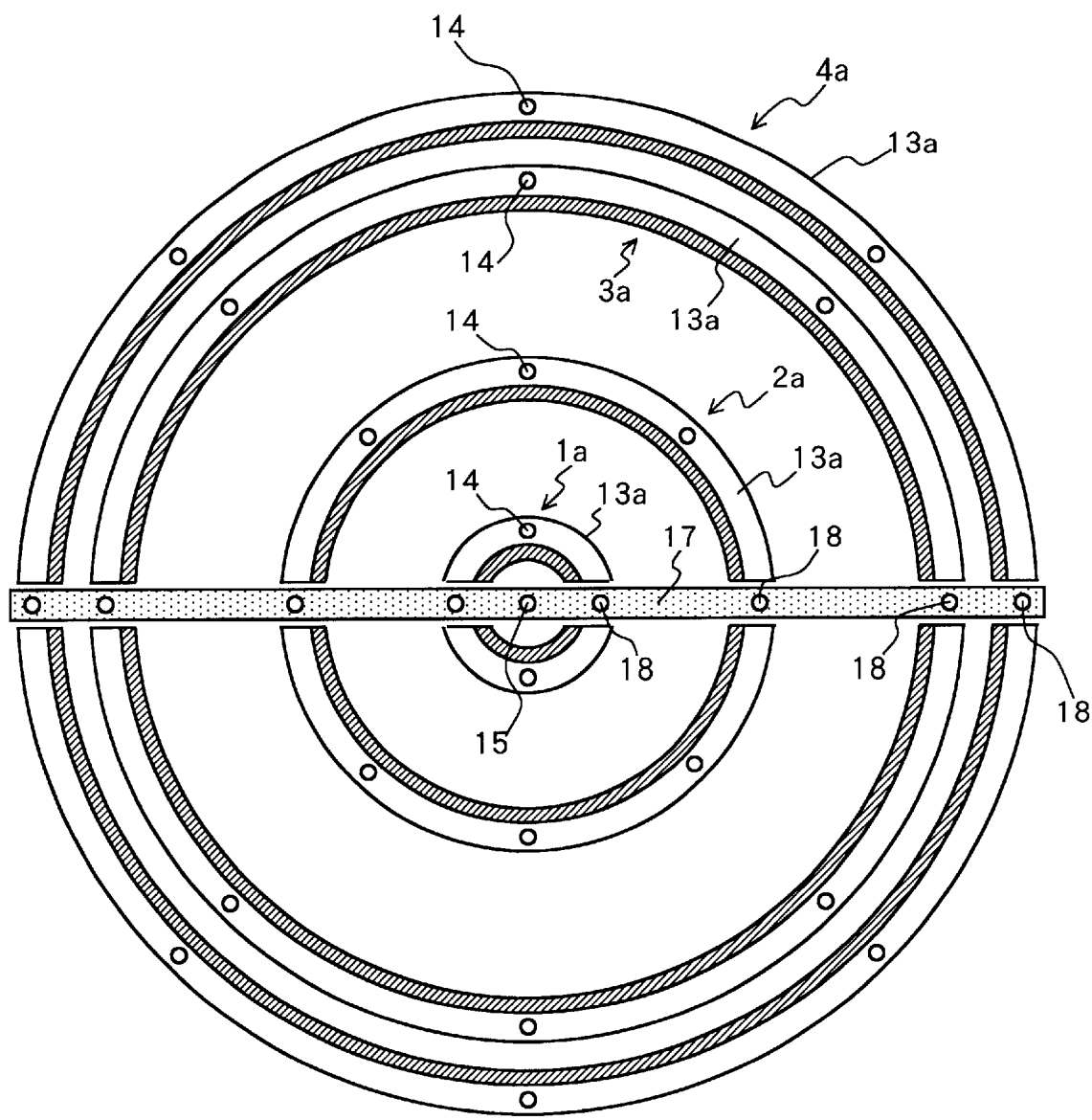
FIG. 5 shows a schematic horizontal cross section view of the assembled globe according to the invention.

FIGS. 2 through 5 are schematic views of the main globe body of this embodiment comprising the first through fourth spheres. More specifically, FIG. 2 is a schematic exploded lateral view and FIG. 3 is a schematic exploded top view of the semispheres of the globe, while FIGS. 4 and 5 are respectively a longitudinal cross sectional view and a schematic transversal cross sectional view of the assembled globe.

Note that these drawings only show the constructional relationship between the spheres, omitting from the drawings the displaying members which are to be arranged in the spaces between the spheres.

The first through fourth spheres 1 through 4 are formed by assembling respective semispheres 1a, 1b, 2a, 2b, 3a, 3b, 4a and 4b along the center line (equator) of the globe. Note that the upper semispheres 1a through 4a correspond to the Northern Hemisphere whereas the lower semispheres 1b through 4b correspond to the Southern Hemisphere. The lines separating the upper and lower semispheres correspond to the equator. Each of the semispheres is provided at the top thereof with a spindle receiving hole 15 for allowing a spindle 23 (FIG. 4) to pass therethrough. The spindle 23 is typically a threaded rod used to preliminarily assemble corresponding spheres. It is rigidly secured to the sphere as it is engaged with nuts 24. Dressed nuts are used for the outermost fourth sphere 4 whereas ordinary nuts are used for the remaining spheres, or the first through third spheres.

Each of the upper semispheres 1a through 4a is provided with a flange 13a projecting outwardly from the outer periphery of the opening thereof and each of the lower semispheres 1b through 4b is provided with a corresponding flange 13b. Thus, the upper and lower semispheres of each of the spheres are rigidly secured to each other as their flanges are bound together by means of bolts (not shown) that are made to pass through the respective bolt receiving holes 14 (FIG. 3) bored through the flanges and brought into tight engagement with respective nuts.

The upper and lower semispheres of each of the spheres are put together by means of a link plate 17. The link plate 17 is typically made of acrylic resin or some other hard and transparent plastic material and has a length equal to the diameter of the flange of the outermost fourth sphere 4 (about 45 cm in the case of a model with a scale of 1/28,000,000), a width of about 3 cm and a thickness of about 3 mm. The link plate 17 is provided with bolt receiving holes 18 arranged at positions corresponding to the flanges of the spheres 1 through 4.

The flanges 13a or 13b of the upper or lower semispheres of the spheres (more specifically upper semispheres 1a through 4a in this embodiment) are provided with notches 16 having a width corresponding to that of the link plate 17. Then, the link plate 17 is rigidly secured to the flanges 13b of the lower semispheres 1b through 4b by means of bolts 21 (FIG. 4) that are made to pass through respective bolt receiving holes 18 (FIG. 3) and nuts 22. Then, the link plate 17 is put into the notches 16 of the flanges 13a of the upper semispheres 1a through 4a and also rigidly secured to the latter by means of bolts (not shown) that are made to pass through respective bolt receiving holes 14 (FIG. 3) and nuts.

As the spheres 1 through 4 are rigidly secured to the link plate 17 and hence relative to each other, the spheres are concentrically aligned and rigidly held in position so that they are made unrotatable relative to each other (around the spindle) and so are the semispheres of each of the sphere along the equator thereof. Thus, the spheres constantly show a same and identical positional relationship relative to each other.

The components of the globe may typically be assembled by the procedure as described below.

First, the spindle 23 is made put into the central bolt-receiving hole 18 at the center of the link plate 17 and rigidly secured to the link plate 17 at the middle point thereof. Then, the spindle 23 is made to pass through the upper semisphere 1a of the first sphere 1 corresponding to the inner core of the earth and the notches 16 of its flange 13a are aligned with the link plate 17. Note that the link plate 17 runs through the inside of the globe without touching any of the above described displaying members 5 through 11 arranged in the spaces between the spheres if it is made to extend between 60° of east longitude and 120° of west longitude.

Then, the spindle 23 is made to pass through the lower semisphere 1b of the sphere 1 corresponding to the inner core of the earth and aligned with the upper semisphere 1a in terms of 60° of east longitude and 120° of west longitude. Then, the upper and lower semispheres 1a, 1b and the link plate 17 are rigidly secured to each other by means of bolts made to pass respectively through the bolt receiving holes 18 of the link plate 17 and the bolt receiving holes 14 of the flanges 13a, 13b and corresponding nuts. Note that small ones of displaying members 5, 6 for vortical convection currents of growth tectonics are already being fitted on the inner core (first sphere) at this stage.

Subsequently, the link plate 17 is fitted to the outer core (second sphere) in a similar manner. Note that the large ones of displaying members 5, 6 for vortical convection currents of growth tectonics are already being fitted to the inner surface of the second sphere by means of pieces of transparent sticky tape.

Thereafter, the lower mantle portion (third sphere) and the upper mantle portion (fourth sphere) are assembled in a similar manner. Dressed nuts are fitted to the upper and lower ends of the spindle 23 to produce a complete main globe body comprising a plurality of transparent spheres. The main globe body can be easily disassembled by disengaging the bolts from the flanges. Then, it can be reassembled by the above procedure. Thereby, additional displaying members can be added and/or any of the existing displaying members can be modified when new geographical and/or geological data are made available.

Figure 6A:
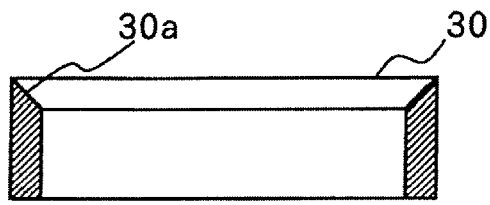
FIG. 6 shows a schematic illustration of the base of the globe according to the invention.
Figure 6B:
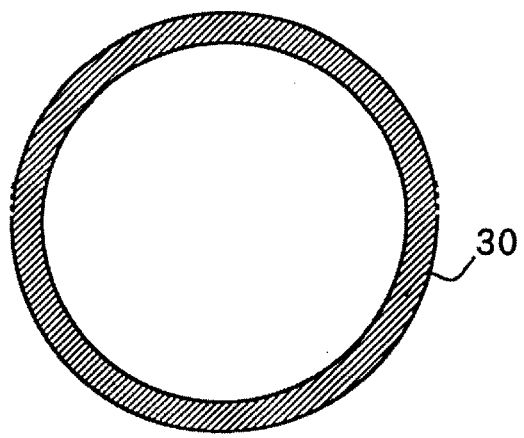

FIG. 6(A) is a schematic longitudinal cross sectional view of the base for supporting the main globe body. FIG. 6(B) is a schematic transversal cross sectional view of the base.

The base 30 has a cylindrical profile and is made of a transparent plastic material. Preferably, it has an inside chamfer 30a running along the upper edge so as to stably support the main globe body.

Figure 7:
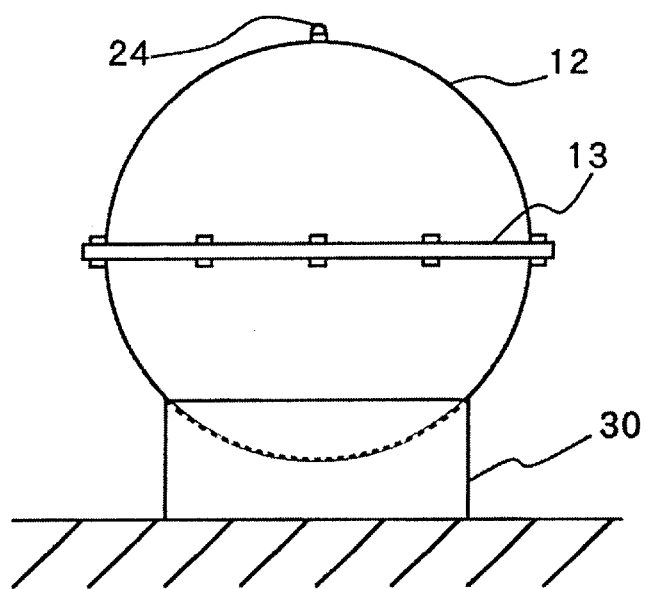
FIG. 7 shows a schematic illustration of the outer view of the globe according to the invention.

FIG. 7 is a schematic lateral view of a globe according to the invention. The main globe body 12 is supported on the base 30 without being rigidly secured to the latter. Thus, the main globe body 12 is simply put on the base 30. Accordingly, it can easily be lifted and rotated by holding the flange 13 to move and change its attitude on the base 30. Such an arrangement is especially advantageous since the globe according to the invention is so designed that the inside view can be seen from its outside through the transparent spheres. Viewers can see the inside of the globe from any desired viewing angle relative to the globe.

Figure 8:
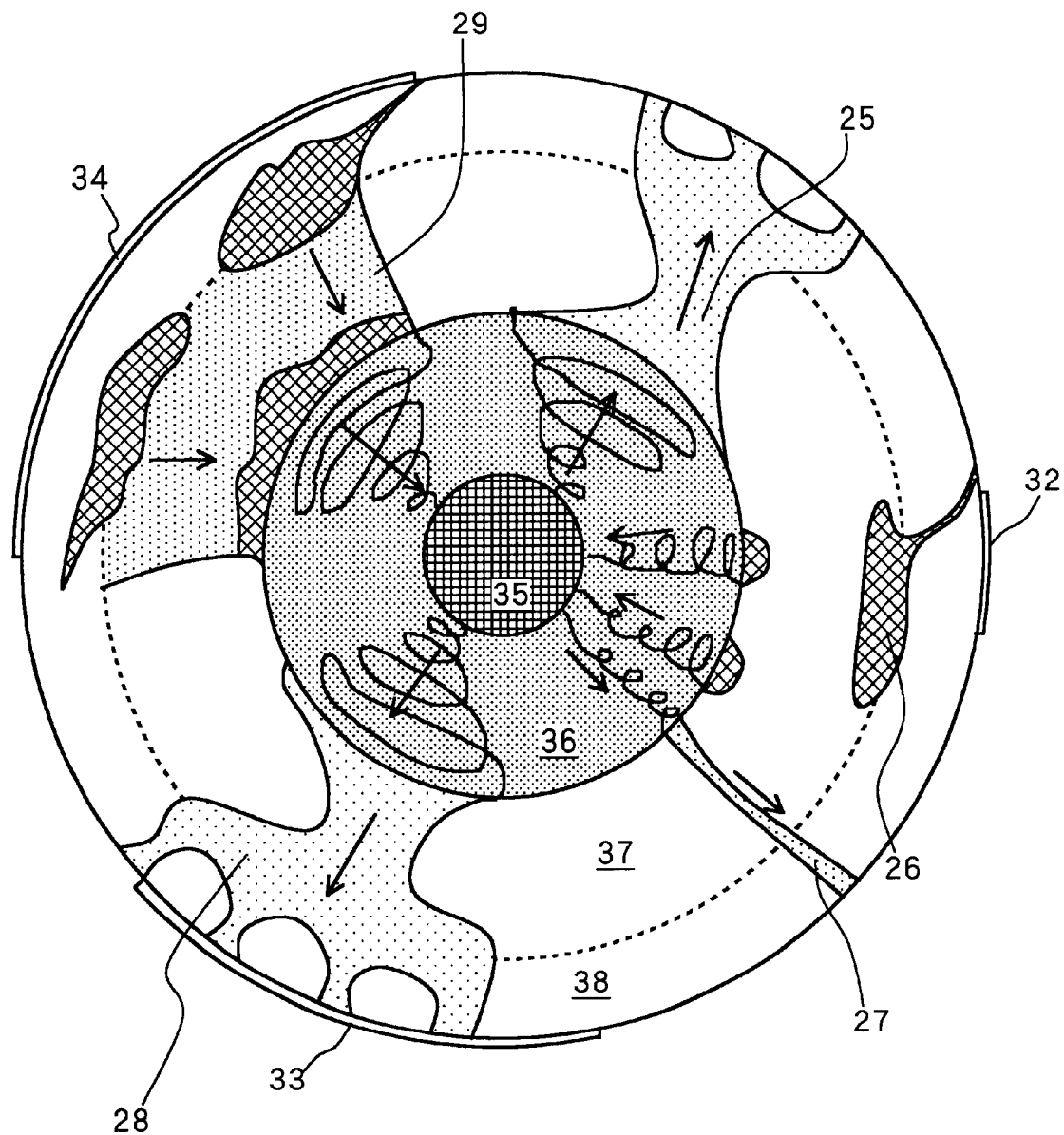
FIG. 8 shows a schematic illustration of the internal structure of the earth.

FIG. 8 shows the internal structure of the earth comprising the inner core 35, the outer core 36, the lower mantle 37 And the upper mantle 38.

The South Pacific Ocean superplume 25 has a reed-like or pillar-like profile showing a substantially circular cross section with a diameter of about 1,500 km in the lower mantle 37. Then, it extends upward toward the about 660 km deep transitional zone (upper part of the lower mantle) to form an elliptic cap-like part extending north and south. The Hawaiian hot spot (not shown) is located at the north end of the cap and the volcanic Mt. Erebus of Antarctica is located near the south end of the cap.

The cold plume 26 extends from below North America to below South America 32 and to the part of the South Atlantic ocean close to South America 32. The narrow Mid-Atlantic Ridges 27 extends at the center of the Atlantic Ocean.

The African superplume 28 is trifurcated right below Madagascar at the depth of 1,800 km and one of the three branches extends toward the Mid-Atlantic to form a major part of the mantle below the African Continent 33. Of the about fifty hot spots of the earth known to data, twenty seven are located right above this superplume. Another one of the three branches extends toward the southeast part of South Africa 33. The remaining one of the three branches extends upward to provide an about 660 km deep transitional zone that extends towards the-Red Sea.

A slab subducts and stagnates right below Central Asia 34 at 660 km depth and the largest cold plume 29 of the lower mantle is located below Asia 34.

As described above, the globe according to the invention is formed by concentrically assembling a plurality of spheres between which three-dimensional displaying members representing the inside of the earth are arranged. Thus, the entire internal structure of the earth can be displayed in physically continuous manner visible through the transparent spheres. Therefore, viewers can easily comprehend the configuration of the inside of the earth and the movements of various portions of the entire earth. The globe according to the invention can be used to provide learners of geography and geology with proper knowledge about the internal structure of the earth. Thus, when properly used, a globe according to the invention can achieve remarkable educational effects in schools and other educational institutions. Additionally, the globe according to the invention can be used to encourage academic discussions in the field of geoscience in various research laboratories and contribute to the development of geoscience particularly from the viewpoint of education and industry.

What is claimed is:

1. A three-dimensional intra-globe model comprising:
a plurality of concentrically arranged spheres, each of the plurality of concentrically arranged spheres defining spaces therebetween, thereby forming a sphere assembly comprising an innermost sphere, said plurality of concentrically arranged spheres, except the innermost sphere, being formed of a transparent material; and
three-dimensional display members arranged in the spaces,
wherein the plurality of concentrically arranged spheres are configured to represent intra-global structures of the earth, the intra-global structures comprising an inner core, an outer core, a lower mantle, and an upper mantle,
wherein the innermost sphere comprises a first sphere, said first sphere being configured to represent the inner core, wherein the sphere assembly further comprises:
a second sphere outside the first sphere, the second sphere being configured to represent the outer core;
a third sphere outside the second sphere, the third sphere being configured to represent the lower mantle; and
a fourth sphere located outside the third sphere, the fourth sphere being configured to represent the upper mantle,
wherein the three-dimensional display members comprise:
high-temperature display members and low-temperature display members located between the first sphere and the second sphere, the high-temperature and low temperature display members being configured to represent characteristics inside the outer core;
hot display members and cold display members located between the second sphere and the third sphere, the hot and cold display members being configured to represent characteristics inside the lower mantle; and
hot plume display members and cold slab display members located between the third sphere and the fourth sphere, the hot plume display members and cold slab display members being configured to represent characteristics inside the upper mantle,
wherein a surface of the fourth sphere is configured to represent structures of the earth's surface.

2. The three-dimensional intra-globe model of claim 1, wherein each of said plurality concentrically arranged spheres comprises a pair of semispheres configured to be assembled and disassembled,
wherein the outermost sphere of the plurality of concentrically arranged spheres comprises a flange projecting outward from a parting interface rim thereof.

3. The three-dimensional intra-globe model of claim 1, further comprising a link plate extending through a center of the sphere assembly,
wherein the link plate renders the plurality of concentrically arranged spheres unrotatable relative to each other.

4. The three-dimensional intra-globe model according to one of claims 1 through 3, further comprising a cylindrical base,
wherein the sphere assembly rests on the cylindrical base without being rigidly fitted thereto.

* * * * *